Figure 1:
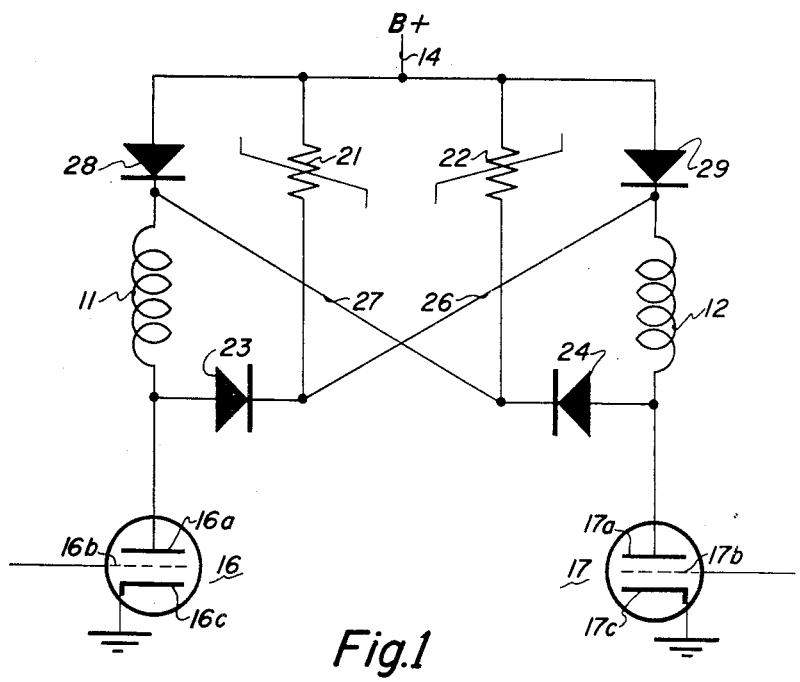

Aug. 30, 1960 W. E. DICKINSON 2,951,186
CIRCUIT FOR ALTERNATELY ENERGIZING TWO ELECTROMAGNETIC DEVICES
Filed May 19, 1958

INVENTOR.
WESLEY E. DICKINSON
BY Walter J. Madden

ATTORNEY

United States Patent Office 2,951,186
Patented Aug. 30, 1960

2,951,186

CIRCUIT FOR ALTERNATELY ENERGIZING TWO ELECTROMAGNETIC DEVICES

Wesley E. Dickinson, Santa Clara County, Calif., assignor to International Business Machines Corporation, New York, N.Y., a corporation of New York Filed May 19, 1958, Ser. No. 736,183

7 Claims. (Cl. 317—123)

This invention relates in general to control circuits for electromagnetic devices and relates more particularly to control circuits for use with a pair of electromagnetic devices which are alternately energized and de-energized.

It is well known that the switching of current to and from an electromagnetic device having appreciable inductance presents various difficulties, owing to the tendency of the device to resist any change in the current flow therethrough. These difficulties are particularly acute where there are a pair of electromagnetic devices and one of the devices is to be disconnected from a source of current while the other is being connected. Such a situation arises, for example, in the current coils of a pair of magnetic clutches which are alternately energized to control the access mechanism of a magnetic storage device. On the one hand, it is necessary to dissipate the energy in the coil which is disconnected, while at the same time it is desirable to provide a rapid build up of current in the coil which is connected in order to reduce the time required for the clutch switching operation.

Broadly, the present invention contemplates a control circuit for a pair of electromagnetic coils which are alternately connected and disconnected, in which a portion of the electromagnetic energy which is built up across the disconnected coil as a result of the disconnection is impressed across the connected coil with the same polarity as the polarity of the source supplying the connected coil. Thus, the electromotive force generated in the disconnected coil as a result of disconnection is impressed on the connected coil in a direction to aid the build up of current in the connected coil. Since the initial rate of change or rate of build up of the current in the connected coil is directly proportional to the impressed voltage, the added voltage impressed on the connected coil from the disconnected coil causes the current to rise more rapidly in the connected coil, thus decreasing the time required for the mechanism associated with the connected coil to become operative.

It is therefore an object of the present invention to provide an improved circuit for controlling the energization and de-energization of a pair of electromagnetic coils.

It is a further object of the present invention to provide an improved circuit for controlling a pair of electromagnetic coils which are alternately energized and de-energized.

It is a further object of this invention to provide a circuit for a pair of electromagnetic coils in which one terminal of each of the coils is connected to the opposite terminal of the other coil, so that upon disconnection of one of the coils and connection of the other of the coils the voltage across the disconnected coil is impressed on the connected coil.

It is an additional object of the present invention to provide a circuit for controlling the simultaneous connection and disconnection of a pair of electromagnetic coils from a source in which the electromotive force developed across the disconnected coil is impressed on the connected coil with a polarity to aid the build up of current through the connected coil.

Other objects of the invention will be pointed out in the following description and claims as illustrated in the accompanying drawing which discloses, by way of example, the principle of the invention and the best mode which has been contemplated of applying that principle.

In the drawing:

Fig. 1 schematically illustrates one embodiment of the present invention in which a common source is utilized to energize both of the electromagnetic coils.

Figure 2:
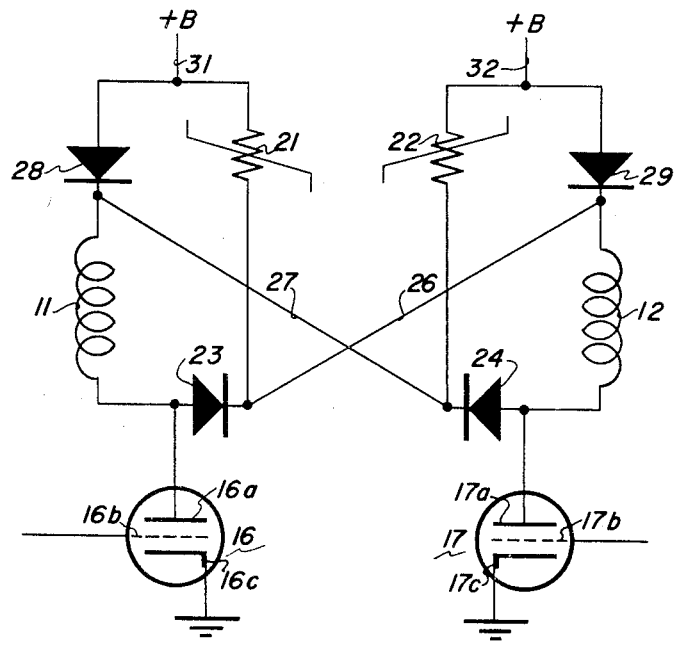

Fig. 2 is a schematic illustration of an alternative embodiment of the present invention in which the electromagnetic coils are energized from separate sources.

Referring to Fig. 1 by character of reference, numerals 11, 12 designate a pair of electromagnetic coils which are to be alternately energized and de-energized. Coils 11 and 12 may be any type possessing sufficient inductance so that they resist any change in the flow of current therethrough. For example, coils 11 and 12 may be the electromagnetic coils associated with a pair of clutches utilized for controlling the access mechanism of a magnetic storage device, as discussed above. Coils 11 and 12 are adapted to be energized from a common source represented by the B+ conductor 14. The energization of coils 11 and 12 from the source represented by conductor 14 is controlled by suitable switch means which connect one of the coils to the source while simultaneously disconnecting the other coil from the source.

Such switch means may be of any suitable type, such as electromagnetic relays or other devices, but preferably the switch means include a pair of vacuum tubes 16 and 17. Tube 16 is provided with an anode or plate 16a which is serially connected with coil 11 and source 14. Tube 16 is also provided with a control grid 16b to which the control impulses are supplied for controlling the energization and de-energization of coil 11. Tube 16 is further provided with a cathode 16c connected to ground to complete the circuit from the B+ conductor 14. Similarly, tube 17 is provided with an anode 17a serially connected with coil 12, a grid 17b to which the control impulses are supplied and a cathode 17c connected to ground. Tubes 16 and 17 are under the control of means (not shown) which supplies control impulses to the tube grids to control the connection and disconnection of the coils.

In the embodiment illustrated in Fig. 1, means are shown for dissipating the energy in the disconnected coil and limiting the voltage rise across the disconnected coil to prevent damage to the tubes or other elements of the circuit. Such voltage limiting means include non-linear resistors 21 and 22. Resistors 21 and 22 may be of any type having a suitable non-linear voltage current characteristic, but preferably such resistors are of the type sold under the trade name "Thyrite." Such resistors have the characteristic that for voltages up to a threshold value the current through the resistor is very low, but at the threshold voltage the current through the resistor increases sharply with with only a slight increase in voltage. Non-linear resistor 21 is connected across coil 11 in circuit with a unidirectional current conducting device 23 which is so poled as to permit current flow only in the direction indicated by the arrow. Similarly, non-linear resistor 22 is connected across coil 12 in circuit with a unidirectional conducting device 24. The junction of resistor 21 and rectifier 23 is connected through a conductor 26 to the upper terminal of coil 12. Similarly, the junction of resistor 22 and rectifier 23 is connected through a conductor 27 to the upper terminal of coil 11. The circuit may also be provided with a pair of unidirectional current conducting devices 28 and 29 for permitting current flow in only one direction, as will be discussed more fully below.

Thus, for a given polarity of voltage across coils 11 and 12, one terminal of each of these coils is effectively connected to the opposite terminal of the other coil, since under these polarity conditions rectifiers 23 and 24 are effectively short circuited. For the other polarity of voltage, devices 23 and 24 present bypassing of the associated coil 11 and 12 through rectifiers 28 and 29.

It will be understood that the voltage limiting resistors 21 and 22 are not essential to the operation of the present invention. The important feature of the present invention is the connection of one terminal of each coil to the opposite terminal of the other coil so that upon disconnection of one coil and connection of the other coil, the voltage across the disconnected coil is impressed on the connected coil with a polarity which aids the build up of current in the connected coil. However, in practice it is desirable to rapidly dissipate the energy in the disconnected coil and to limit the voltage across the disconnected coil in order to prevent over voltage damage to tubes and other elements, and accordingly applicant has illustrated the voltage limiting networks shown in the drawing for these purposes.

In operation, assume that grid 16b of tube 16 is sufficiently positive to render tube 16 conductive, thus permitting current flow from source 14 through coil 11. Under these conditions, rectifier 23 prevents any appreciable current flow either through non-linear resistor 21 or from rectifier 29 and conductor 26. While tube 16 is conducting and coil 11 is energized, grid 17b of tube 17 is sufficiently negative to cut the tube off, thus preventing any current flow through coil 12. Now, assuming that it is desired to disconnect coil 11 and simultaneously therewith energize coil 12, the operation is as follows: To disconnect coil 11, grid 16b is driven sufficiently negative to cut tube 16 off, thus stopping the flow of current therethrough. Simultaneously therewith, grid 17b of tube 17 is driven sufficiently positive to render tube 17 conductive.

However, current does not begin to flow instantaneously through coil 12 and tube 17 from source 14, owing to the inductance of coil 12 and the resulting resistance to any change in the flow of current. To assist in the build up of current through coil 12 the present invention operates as follows: When tube 16 is rendered non-conductive in response to the de-energization signal, the inductance of coil 11 causes a back electromotive force to build up across coil 11 with a polarity opposite to the polarity of the voltage drop across coil 11 with normal current flow therethrough. At the instant of disconnection of coil 11, the back electromotive force across coil 11 may exceed the voltage of source 14. Under these conditions, the lower terminal of coil 11 will be more positive in voltage than source 14. This back electromotive force of coil 11 is impressed on coil 12 through conductor 26 so that the back electromotive force is applied to coil 12 with the same polarity as the voltage from source 14. Since the initial rate of current change or build up in coil 12 is directly proportional to the voltage impressed across the coil, the increased voltage impressed from coil 11 aids the rapid build up of current through coil 12. Rectifier device 29 prevents any current flow back to source 14 when the back electromotive force of coil 11 exceeds the voltage of source 14.

When tube 17 is rendered non-conductive to de-energize coil 12, and tube 16 is rendered conductive to energize coil 11, the operation is similar to that described above. The back electromotive force developed across coil 12 in response to interruption of the current therethrough is impressed on coil 11 through conductor 27 with a polarity which is the same as the polarity of source 14 so as to aid in the rapid build up of current through coil 11.

It will be understood that the boosting effect provided by the back electromotive force generated in the disconnected coil is only a transient one and will persist only the length of time required to dissipate a substantial portion of the energy stored in the disconnected coil. However, it is desirable that this effect only persist for a relatively short time, since the extra voltage is needed only at the first instant of connection of coil 12 to source 14. To aid in dissipating the energy stored in the disconnected coil and to prevent over voltage damage to any circuit components, the voltage limiting networks including resistors 21, 22 are provided. As indicated above, the voltage current characteristic of resistors 21, 22 are such that up to a predeterminable threshold value of voltage, the current through the resistor is very small and for values of voltage only slightly above the threshold value the current through the resistor increases rapidly. With tube 16 conductive and current flowing through coil 11, the forward resistance of rectifier 29 is so low that no appreciable voltage appears across resistor 21. Additionally, half-wave rectifier 23 substantially prevents any current flow through either resistor 21 or rectifier 29 from source 14.

However, upon rendering tube 16 non-conductive, the back electromotive force built up across coil 11 exceeds the threshold voltage of resistor 21 so that an appreciable current flows through resistor 21 under these conditions. It will be noted that with the reversal of the polarity of the voltage across coil 11, the poling of rectifier 23 is such as to permit current flow through resistor 21. Resistor 21 has the effect of limiting voltage which can appear as a back electromotive force across coil 11, since the voltage across resistor 21 increases only slightly above the threshold value regardless of the current flow therethrough. Thus, resistor 21 serves to dissipate the energy stored in coil 11 and to limit the voltage which can appear across tube 16, thereby preventing the appearance of voltages which could damage tube 16. The operation of resistor 22 and rectifier 24 in dissipating the energy in and limiting the voltage across coil 12 is substantially identical to that described above for coil 11.

Fig. 2 illustrates an alternate embodiment of the present invention in which the coils 11 and 12 are energized from separate sources. In the embodiment of Fig. 2, it is again assumed that coils 11 and 12 are to be connected and disconnected in response to control impulses supplied to the grids of tubes 16 and 17. Coil 11 is adapted to be energized by a source represented by a B+ conductor 31, while coil 12 is adapted to be energized from a separate source represented by a B+ conductor 32. An examination of the circuit of Fig. 2 will show that its operation will be essentially the same as that discussed above in connection with the embodiment of Fig. 1. That is, coils 11 and 12 may be energized from separate sources, as shown in Fig. 2, so long as one coil is to be disconnected substantially simultaneously with the connection of the other coil, so that the back electromotive force produced in the disconnected coil is impressed on the connected coil with the proper polarity to aid the voltage of the source in producing a rapid build up of current through the connected coil.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A control circuit for a pair of coils having appreciable inductances comprising switch means for alternately connecting one of said coils in circuit with a source of voltage and disconnecting the other of said coils from a source of voltage, and means connecting one terminal of each of said coils to the opposite terminal of the other of said coils, whereby upon disconnection of either of said coils the voltage appearing across the disconnected coil is impressed on the other of said coils with the same polarity as the voltage of the source to which said other coil is connected.

2. A control circuit for a pair of coils having appreciable inductances comprising a source of voltage, switch means for alternately connecting one of said coils in circuit with said source and disconnecting the other of said coils from said source, and means connecting one terminal of each of said coils to the opposite terminal of the other of said coils, whereby upon disconnection of either of said coils from said source, the voltage appearing across the disconnected coil is impressed on the other of said coils with the same polarity as the voltage of said source.

3. A control circuit for a pair of electromagnetic coils which are adapted to be alternately connected and disconnected from a common source of voltage by switch means connected in circuit with said source and said coils, comprising means connecting one terminal of each of said coils to the opposite terminal of the other of said coils, whereby upon disconnection of one of said coils from said source and connection of the other of said coils to said source, the voltage across said disconnected coil is impressed on said connected coil with the same polarity as the voltage of said source.

4. A control circuit for a pair of coils having appreciable inductances comprising a source of voltage, first switch means connected in circuit with one of said coils and said source, second switch means connected in circuit with the other of said coils and said source in parallel with said first switch means, means connected to said first and said second switch means for alternately connecting one of said coils to said source and disconnecting the other of said coils from said source, and means connecting one terminal of each of said coils to the opposite terminal of the other of said coils, whereby upon disconnection of one of said coils from said source, the voltage appearing across said disconnected coil is impressed on the other of said coils with the same polarity as the voltage of said source.

5. A control circuit for a pair of coils having appreciable inductances comprising a source of voltage for energizing said coils, first switch means serially connected with said source and one of said coils, second switch means serially connected with said source and the other of said coils, a first voltage limiting network connected across said one coil, a second voltage limiting network connected across said other coil, each of said voltage limiting networks including a resistance element having a non-linear voltage current characteristic, whereby the voltage across each of said coils is limited by the characteristic of said resistance element, means for controlling said first and said second switch means to alternately connect one of said coils to said source and to disconnect the other of said coils from said source, and means connecting one terminal of each of said coils with the opposite terminal of the other of said coils, whereby upon disconnection of one of said coils from said source, the voltage appearing across said disconnected coil is limited by said voltage limiting network and is impressed on the other of said coils with the same polarity as the voltage of said source.

6. A control circuit for a pair of coils having appreciable inductances comprising a source of voltage for energizing said coils, first switch means serially connected with said source and one of said coils, second switch means serially connected with said source and the other of said coils, a first voltage limiting network connected across said one coil, a second voltage limiting network connected across said other coil, each of said voltage limiting networks including a unidirectional current conducting device serially connected with a resistance element having a non-linear voltage current characteristic, whereby the voltage across each of said coils is limited by the characteristic of said resistance element, means for controlling said first and said second switch means to alternately connect one of said coils to said source and to disconnect the other of said coils from said source, and means connecting one terminal of each of said coils with the opposite terminal of the other of said coils, whereby upon disconnection of one of said coils from said source, the voltage appearing across said disconnected coil is limited by said voltage limiting network and is impressed on the other of said coils with the same polarity as the voltage of said source.

7. A control circuit for a pair of coils having appreciable inductances comprising a source of voltage for energizing said coils, first switch means serially connected with said source and one of said coils, second switch means serially connected with said source and the other of said coils, a first voltage limiting network connected across said one coil, a second voltage limiting network connected across said other coil, each of said voltage limiting networks including a unidirectional current conducting device serially connected with a resistance element having a non-linear voltage current characteristic, whereby the voltage across each of said coils is limited by the characteristic of said resistance element, means for controlling said first and said second switch means to alternately connect one of said coils to said source and disconnect the other of said coils from said source, means connecting one terminal of each of said coils and said unidirectional device for each of said networks with the opposite terminal of the other of said coils, whereby upon disconnection of one of said coils from said source, the voltage appearing across said disconnected coil is limited by said voltage limiting network and is impressed on the other of said coils with the same polarity as the voltage of said source, and diode means for preventing current flow from said disconnected coil to said source.

References Cited in the file of this patent

UNITED STATES PATENTS

| | | |
|---|---|---|
| 2,538,789 | Maynard | Jan. 23, 1951 |
| 2,717,977 | Decker | Sept. 13, 1955 |